United States Patent
Hong

(10) Patent No.: US 11,737,126 B2
(45) Date of Patent: Aug. 22, 2023

(54) METHOD AND DEVICE FOR CONTROLLING INTERFERENCE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 272 days.

(21) Appl. No.: 16/633,541

(22) PCT Filed: Aug. 10, 2017

(86) PCT No.: PCT/CN2017/096863
§ 371 (c)(1),
(2) Date: Jan. 23, 2020

(87) PCT Pub. No.: WO2019/028750
PCT Pub. Date: Feb. 14, 2019

(65) Prior Publication Data
US 2020/0236684 A1 Jul. 23, 2020

(51) Int. Cl.
*H04W 72/08* (2009.01)
*H04W 72/541* (2023.01)
*H04W 72/27* (2023.01)

(52) U.S. Cl.
CPC ......... *H04W 72/541* (2023.01); *H04W 72/27* (2023.01)

(58) Field of Classification Search
CPC ................ H04W 72/082; H04W 72/0426
See application file for complete search history.

(56) References Cited

U.S. PATENT DOCUMENTS

| 8,412,256 | B2 | 4/2013 | Lee |
| 9,066,357 | B2 | 6/2015 | Dimou et al. |
| 9,596,695 | B2 | 3/2017 | Dimou et al. |
| 2010/0267408 | A1 | 10/2010 | Lee |

(Continued)

FOREIGN PATENT DOCUMENTS

| CN | 101394649 A | 3/2009 |
| CN | 101534560 A | 9/2009 |

(Continued)

OTHER PUBLICATIONS

International Search Report in the international application No. PCT/CN2017/096863, dated May 7, 2018.

(Continued)

*Primary Examiner* — Rhonda L Murphy
(74) *Attorney, Agent, or Firm* — Syncoda LLC; Feng Ma

(57) ABSTRACT

A method for controlling interference includes that: in response to determining presence of interference from an unmanned aerial vehicle (UAV) or a terminal similar to a UAV, determining a target resource block, from all resource blocks for data transmission, which is interfered with by the UAV or the terminal similar to the UAV; generating a target notification message, the target notification message carrying resource block information of the target resource block and an interference indication identification, the interference indication identification being used to indicate that the interference comes from the UAV or the terminal similar to a UAV; and sending the target notification message to a second base station.

20 Claims, 22 Drawing Sheets

(56) References Cited

U.S. PATENT DOCUMENTS

| | | |
|---|---|---|
| 2011/0235598 A1 | 9/2011 | Hilborn |
| 2011/0312342 A1 | 12/2011 | Eguchi |
| 2014/0187255 A1 | 7/2014 | Dimou et al. |
| 2015/0312918 A1 | 10/2015 | Dimou et al. |
| 2016/0044689 A1 | 2/2016 | Wen et al. |
| 2016/0157103 A1 | 6/2016 | Teng et al. |
| 2017/0126309 A1 | 5/2017 | Rupasinghe et al. |
| 2018/0295633 A1 | 10/2018 | Abdelmonem et al. |
| 2019/0052294 A1* | 2/2019 | Abdelmonem ...... H04B 17/336 |
| 2019/0268676 A1* | 8/2019 | Teichmann .............. H04Q 9/00 |
| 2020/0236684 A1 | 7/2020 | Hong |

FOREIGN PATENT DOCUMENTS

| | | |
|---|---|---|
| CN | 101572868 A | 11/2009 |
| CN | 101815301 A | 8/2010 |
| CN | 101827053 A | 9/2010 |
| CN | 101860880 A | 10/2010 |
| CN | 102065488 A | 5/2011 |
| CN | 102118800 A | 7/2011 |
| CN | 102821418 A | 12/2012 |
| CN | 103428871 A | 12/2013 |
| CN | 204131534 U | 1/2015 |
| CN | 104982086 A | 10/2015 |
| CN | 105103640 A | 11/2015 |
| CN | 107004345 A | 8/2017 |
| EP | 2288217 A2 | 2/2011 |
| WO | 2009121010 A2 | 10/2009 |
| WO | 2013033907 A1 | 3/2013 |
| WO | 2013040742 A1 | 3/2013 |
| WO | WO-2016005003 A1 * | 1/2016 ........... H04B 7/0413 |
| WO | 2017019595 A1 | 2/2017 |
| WO | 2017048446 A1 | 3/2017 |

OTHER PUBLICATIONS

English translation of the Written Opinion of the International Search Authority in the international application No. PCT/CN2017/096863, dated May 7, 2018.

First Office Action of the Chinese application No. 201780001098.4, dated Jul. 22, 2020.

International Search Report in the international application No. PCT/CN2017/094119, dated Mar. 29, 2018.

Written Opinion of the International Search Authority in the international application No. PCT/CN2017/094119, dated Mar. 29, 2018.

Supplementary European Search Report in the European application No. 17919359.4, dated Feb. 28, 2020.

Non-Final Office Action of the U.S. Appl. No. 16/497,165, dated Apr. 14, 2022.

First Office Action of the European application No. 17919359.4, dated Mar. 11, 2021.

Office Action of the Indian application No. 201947039284, dated Oct. 5, 2021.

3GPP TSG RAN WG1 Meeting #47bis R1-070099, Sorrento, Italy, Jan. 15-19, 2007; Source: NTT DoCoMo; Title: Frequency Domain Channel-Dependent Scheduling Considering Interference to Neighbouring Cell for E-UTRA Uplink.

First Office Action of the Chinese application No. 201780000678.1, dated Sep. 30, 2022.

* cited by examiner

METHOD AND DEVICE FOR CONTROLLING INTERFERENCE

CROSS-REFERENCE TO RELATED APPLICATION

This application is the US National Stage of PCT Application No. PCT/CN2017/096863 filed on Aug. 10, 2017, the disclosure of which is hereby incorporated by reference in its entirety.

TECHNICAL FIELD

The present disclosure relates to the technical field of communications, and more particularly, to a method and device for controlling interference.

BACKGROUND

Nowadays, unmanned aerial vehicles are becoming increasingly prevalent. When an unmanned aerial vehicle communicates with a cellular network, a signal from the unmanned aerial vehicle is broadcast in space. In addition to a serving base station currently serving the unmanned aerial vehicle, other base stations near the unmanned aerial vehicle may also receive the signal transmitted by the unmanned aerial vehicle. Therefore, interference will be caused to other base stations than the serving base station.

However, in a new generation of network communication system, there is no solution for how to control the above interference.

SUMMARY

To overcome the problems in the related art, the embodiments of the present disclosure provide a method and device for controlling interference.

According to a first aspect of the embodiments of the present disclosure, a method for controlling interference is provided. The method may be applied to a first base station, and may include the following operations:

in response to determining presence of interference from an unmanned aerial vehicle or a terminal similar to an unmanned aerial vehicle, a target resource block that is interfered with by the unmanned aerial vehicle or the terminal similar to the unmanned aerial vehicle is determined from all resource blocks for data transmission;

a target notification message is generated, where the target notification message carries resource block information of the target resource block and an interference indication identifier, the interference indication identifier is used to indicate that the interference comes from the unmanned aerial vehicle or the terminal similar to the unmanned aerial vehicle; and the target notification message is sent to a second base station, so that the second base station determines, based on the target notification message, a target terminal from terminals served by the second base station, verifies legality of the target terminal to obtain a verification result, and reduces interference with the target resource block according to at least one of the verification result or a terminal type to which the target terminal belongs, where the second base station is a base station adjacent to the first base station, and the target terminal is a terminal that is using the target resource block.

In some embodiments, the operation of determining the presence of the interference from the unmanned aerial vehicle or the terminal similar to the unmanned aerial vehicle may include that:

an angle of arrival corresponding to a presently received interference signal is detected, where the angle of arrival is an angle between the interference signal and a horizontal plane; and when an angle value of the angle of arrival exceeds a preset value, the presence of the interference from the unmanned aerial vehicle or the terminal similar to the unmanned aerial vehicle is determined.

In some embodiments, the operation of determining the target resource block, from the all resource blocks for data transmission, which is interfered with by the unmanned aerial vehicle or the terminal similar to the unmanned aerial vehicle may include that:

signal to noise ratios corresponding to the all resource blocks for data transmission are detected, and at least one resource block is selected according to a descending order of the signal to noise ratios as a target resource block that is interfered with by the unmanned aerial vehicle or the terminal similar to the unmanned aerial vehicle.

In some embodiments, the operation of sending the target notification message to a second base station may include that:

the target notification message is sent to the second base station; or the target notification message is sent to a core network, so that the core network forwards the target notification message to the second base station.

According to a second aspect of the embodiments of the present disclosure, a method for controlling interference is provided. The method may be applied to a second base station, and may include the following operations:

a target notification message from a first base station is received, where the first base station is a base station adjacent to the second base station and interfered with by an unmanned aerial vehicle or a terminal similar to an unmanned aerial vehicle, the target notification message carries resource block information of a target resource block of the first base station that is interfered with by the unmanned aerial vehicle or the terminal similar to the unmanned aerial vehicle and an interference indication identifier, the interference indication identifier is used to indicate that interference comes from the unmanned aerial vehicle or the terminal similar to the unmanned aerial vehicle;

a target terminal is determined, based on the target notification message, from terminals served by the second base station, where the target terminal is a terminal that os using the target resource block;

legality of the target terminal is verified to obtain a verification result; and interference with the target resource block is reduced according to at least one of the verification result or a terminal type to which the target terminal belongs.

In some embodiments, the operation of receiving a target notification message from a first base station may include that:

a target notification message from the first base station is received; or a target notification message forwarded by a core network is received, where the target notification message is sent to the core network by the first base station.

In some embodiments, the operation of verifying the legality of the target terminal to obtain the verification result may include that:

a target terminal identifier of the target terminal is sent to a verifier, so that the verifier searches for the target terminal identifier in a pre-stored legal identification information list, and when the legal identification information list includes the target terminal identifier, the verification result is determined to be legal, and otherwise the verification result is determined to be illegal, where the legal identification information list includes identification information corresponding to all registered terminals; and the verification result returned by the verifier is received, where the verifier is the core network or a verification server.

In some embodiments, the terminal type to which the target terminal belongs may be determined in the following manners:

a target terminal identifier of the target terminal is sent to the core network, so that the core network determines a terminal type corresponding to the target terminal identifier according to a pre-stored correspondence between a terminal identifier and a terminal type; and the terminal type returned by the core network is received.

In some embodiments, the operation of reducing the interference with the target resource block according to at least one of the verification result or the terminal type to which the target terminal belongs may include that:

when the verification result is illegal, an established connection with the target terminal is released.

In some embodiments, the operation of reducing the interference with the target resource block according to at least one of the verification result or the terminal type to which the target terminal belongs may include that:

when the verification result is legal and the terminal type does not belong to an unmanned aerial vehicle type, power on the target resource block is reduced;

or, when the verification result is legal and the terminal type does not belong to an unmanned aerial vehicle type, other resource blocks are allocated to the target terminal.

In some embodiments, the operation of reducing the interference with the target resource block according to at least one of the verification result or a terminal type to which the target terminal belongs may include that:

when the verification result is legal and the terminal type belongs to an unmanned aerial vehicle type, it is judged whether a priority of a service presently carried by the target terminal exceeds a preset priority;

when the priority of the service presently carried by the target terminal exceeds the preset priority, other resource blocks are allocated to a terminal that is using the target resource block and does not belong to an unmanned aerial vehicle type; and when the priority of the service presently carried by the target terminal does not exceed the preset priority, power on the target resource block is reduced, or other resource blocks are allocated to the target terminal.

According to a third aspect of the embodiments of the present disclosure, a device for controlling interference is provided. The device may be applied to a first base station, and may include:

a resource block determining module, configured to determine, in response to determining presence of interference from an unmanned aerial vehicle or a terminal similar to an unmanned aerial vehicle, a target resource block, from all resource blocks for data transmission, which is interfered with by the unmanned aerial vehicle or the terminal similar to the unmanned aerial vehicle;

a message generating module, configured to generate a target notification message, where the target notification message carries resource block information of the target resource block and an interference indication identifier, and the interference indication identifier is used to indicate that the interference comes from the unmanned aerial vehicle or the terminal similar to the unmanned aerial vehicle; and a sending module, configured to send the target notification message to a second base station, so that the second base station determines, based on the target notification message, a target terminal from terminals served by the second base station, verifies legality of the target terminal to obtain a verification result, and reduces interference with the target resource block according to at least one of the verification result or a terminal type to which the target terminal belongs, where the second base station is a base station adjacent to the first base station, and the target terminal is a terminal that is using the target resource block.

In some embodiments, the resource block determining module may include:

a detection sub-module, configured to detect an angle of arrival corresponding to a presently received interference signal, where the angle of arrival is an angle between the interference signal and a horizontal plane; and a first determination sub-module, configured to determine, when an angle value of the angle of arrival exceeds a preset value, the presence of interference from the unmanned aerial vehicle or the terminal similar to the unmanned aerial vehicle.

In some embodiments, the resource block determining module may include:

a second determination sub-module, configured to detect signal to noise ratios corresponding to all resource blocks for data transmission, and select, according to a descending order of the signal to noise ratios, at least one resource block as the target resource block that is interfered with by the unmanned aerial vehicle or the terminal similar to the unmanned aerial vehicle.

In some embodiments, the sending module may include:

a first sending sub-module, configured to send the target notification message to the second base station; or a second sending sub-module, configured to send the target notification message to a core network, so that the core network forwards the target notification message to the second base station.

According to a fourth aspect of the embodiments of the present disclosure, a device for controlling interference is provided. The device may be applied to a second base station, and may include:

a receiving module, configured to receive a target notification message from a first base station, where the first base station is a base station adjacent to the second base station and interfered with by an unmanned aerial vehicle or a terminal similar to an unmanned aerial vehicle, the target notification message carries resource block information of a target resource block of the first base station that is interfered with by the unmanned aerial vehicle or the terminal similar to the unmanned aerial vehicle and an interference indication identifier, and the interference indication identifier is used to indicate that interference comes from the unmanned aerial vehicle or the terminal similar to the unmanned aerial vehicle;

a terminal determining module, configured to determine, based on the target notification message, a target terminal from terminals served by the second base station, where the target terminal is a terminal that is using the target resource block;

a verification module, configured to verify legality of the target terminal to obtain a verification result; and an execution module, configured to reduce interference with the target resource block according to at least one of the verification result or a terminal type to which the target terminal belongs.

In some embodiments, the receiving module may include:

a first receiving sub-module, configured to receive a target notification message from the first base station; or a second receiving sub-module, configured to receive a target notification message forwarded by a core network, where the target notification message is sent to the core network by the first base station.

In some embodiments, the verification module may include:

a third sending sub-module, configured to send a target terminal identifier of the target terminal to a verifier, so that the verifier searches for the target terminal identifier in a pre-stored legal identification information list, and when the legal identification information list includes the target terminal identifier, the verification result is determined to be legal, and otherwise the verification result is determined to be illegal, the legal identification information list includes identification information corresponding to all registered terminals; and a third receiving sub-module, configured to receive the verification result returned by the verifier, where the verifier is the core network or a verification server.

In some embodiments, the execution module may include:

a fourth sending sub-module, configured to send a target terminal identifier of the target terminal to the core network, so that the core network determines a terminal type corresponding to the target terminal identifier according to a pre-stored correspondence between a terminal identifier and a terminal type; and a fourth receiving sub-module, configured to receive the terminal type returned by the core network.

In some embodiments, the execution module may include:

a first execution sub-module, configured to release, when the verification result is illegal, an established connection with the target terminal.

In some embodiments, the execution module may include:

a second execution sub-module, configured to reduce, when the verification result is legal and the terminal type does not belong to an unmanned aerial vehicle type, power on the target resource block; or a third execution sub-module, configured to allocate, when the verification result is legal and the terminal type does not belong to an unmanned aerial vehicle type, other resource blocks to the target terminal.

In some embodiments, the execution module may include:

a judgment sub-module, configured to judge, when the verification result is legal and the terminal type belongs to an unmanned aerial vehicle type, whether a priority of a service presently carried by the target terminal exceeds a preset priority;

a fourth execution sub-module, configured to allocate, when the priority of the service presently carried by the target terminal exceeds the preset priority, other resource blocks to a terminal that is using the target resource block and does not belong to an unmanned aerial vehicle type; and a fifth execution sub-module, configured to reduce, when the priority of the service presently carried by the target terminal does not exceed the preset priority, power on the target resource block, or allocate other resource blocks to the target terminal.

According to a fifth aspect of the embodiments of the present disclosure, a computer readable storage medium is provided, which may store a computer program, the computer program is configured to execute the method for controlling interference in the first aspect.

According to a sixth aspect of the embodiments of the present disclosure, a computer readable storage medium is provided, which may store a computer program, the computer program is configured to execute the method for controlling interference in the second aspect.

According to a seventh aspect of the embodiments of the present disclosure, a device for controlling interference is provided. The device may be applied to a first base station, and may include:

a processor; and a memory configured to store instructions executable for the processor, where the processor is configured to:

determine, in response to determining presence of interference from an unmanned aerial vehicle or a terminal similar to an unmanned aerial vehicle, a target resource block, from all resources blocks for data transmission, which is interfered with by the unmanned aerial vehicle or the terminal similar to the unmanned aerial vehicle;

generate a target notification message, where the target notification message carries resource block information of the target resource block and an interference indication identifier, and the interference indication identifier is used to indicate that the interference comes from the unmanned aerial vehicle or the terminal similar to the unmanned aerial vehicle; and send the target notification message to a second base station, so that the second base station determines, based on the target notification message, a target terminal from terminals served by the second base station, verifies legality of the target terminal to obtain a verification result, and reduces interference with the target resource block according to at least one of the verification result or a terminal type to which the target terminal belongs, where the second base station is a base station adjacent to the first base station, and the target terminal is a terminal that is using the target resource block.

According to an eighth aspect of the embodiments of the present disclosure, a device for controlling interference is provided. The device may be applied to a second base station, and may include:

a processor; and a memory configured to store instructions executable for the processor, where the processor is configured to:

receive a target notification message from a first base station, where the first base station is a base station adjacent to the second base station and interfered with by an unmanned aerial vehicle or a terminal similar to an unmanned aerial vehicle, the target notification message carries resource block information of a target resource block of the first base station that is interfered with by the unmanned aerial vehicle or the terminal similar to the unmanned aerial vehicle and an interference indication identifier, and the interference indication identifier is used to indicate that interference comes from the unmanned aerial vehicle or the terminal similar to the unmanned aerial vehicle;

determine, based on the target notification message, a target terminal from terminals served by the second base station, where the target terminal is a terminal that is using the target resource block;

verify legality of the target terminal to obtain a verification result; and reduce interference with the target resource block according to at least one of the verification result or a terminal type to which the target terminal belongs.

The technical solutions provided by the embodiments of the present disclosure may provide the following beneficial effects.

In the embodiments of the present disclosure, a first base station that is interfered with by an unmanned aerial vehicle or a terminal similar to an unmanned aerial vehicle may determine a target resource block, from all resource blocks for data transmission, which is interfered with by the unmanned aerial vehicle or the terminal similar to the unmanned aerial vehicle. Further, a target notification message is generated, where the target notification message may carry interference identification information for indicating that the current interference comes from the unmanned aerial vehicle or the terminal similar to the unmanned aerial vehicle, and resource block information of the target resource block. The first base station sends the target notification message to a second base station adjacent thereto, so that after determining, based on the target notification message, a target terminal from terminals served by the second base station, the second base station may verify legality of the target terminal to obtain a verification result, where the target terminal is a terminal that is using the target resource block. The second base station reduces interference with the target resource block according to at least one of the verification result or a terminal type to which the target terminal belongs. With the above process, the interference with a cellular network base station from an illegal terminal may be precisely reduced, and unnecessary impact on a legal terminal may be avoided.

In the embodiments of the present disclosure, the first base station may detect an angle of arrival corresponding to a currently received interference signal, and when an angle value of the angle of arrival exceeds a preset value, the presence of interference from an unmanned aerial vehicle or a terminal similar to an unmanned aerial vehicle may be determined. With the above process, it may be determined whether a base station is interfered with by an unmanned aerial vehicle or a terminal similar to an unmanned aerial vehicle, and the availability is high.

In the embodiments of the present disclosure, the first base station may detect signal to noise ratios corresponding to all resource blocks for data transmission, and select, according to a descending order of the signal to noise ratios, at least one resource block as a target resource block that is interfered with by the unmanned aerial vehicle or the terminal similar to an unmanned aerial vehicle. With the above process, a resource block with a higher signal to noise ratio may be used as a target resource block that is interfered with by the unmanned aerial vehicle or the terminal similar to an unmanned aerial vehicle, and the availability is high.

In the embodiments of the present disclosure, the first base station may directly send a generated target notification message to the second base station through an interface between the base stations. Or, the first base station may send the target notification message to a core network, and the core network forwards the target notification message to the second base station. Therefore, the second base station may reduce interference with the target resource block according to at least one of the verification result about legality of the target terminal or a terminal type to which the target terminal belongs, so that the interference with a cellular network base station from an illegal terminal may be precisely reduced, and unnecessary impact on a legal terminal may be avoided.

In the embodiments of the present disclosure, after receiving the target notification message sent by the first base station, the second base station may determine, based on the target notification message, a target terminal from terminals served by the second base station, where the target terminal is a terminal that is using the target resource block. Further, legality of the target terminal is verified to obtain a verification result, thereby reducing interference with the target resource block according to at least one of the verification result or a terminal type to which the target terminal belongs. With the above process, the interference with a cellular network base station from an illegal terminal may be precisely reduced, and unnecessary impact on a legal terminal may be avoided.

In the embodiments of the present disclosure, the second base station may directly receive the target notification message sent by the first base station or receive the target notification message forwarded by the core network, and the availability is high.

In the embodiments of the present disclosure, when needing to obtain a verification result about legality of a target terminal, the second base station may send a target terminal identifier of the target terminal to a verifier, the verifier may be a core network or a verification server, and the verifier searches for the target terminal identifier in a legal identification information list. If the target terminal identifier is present in the legal identification information list, the verifier determines the verification result as legal, and otherwise, as illegal. The second base station receives the verification result returned by the verifier, so that the legality of the target terminal may be determined. The implementation is simple, and the accuracy of subsequent reduction of interference to a target resource block is ensured.

In the embodiments of the present disclosure, the second base station may send a target terminal identifier of a target terminal to a core network, and the core network determines a terminal type corresponding to the target terminal identifier according to a pre-stored correspondence between a terminal identifier and a terminal type. Further, the second base station receives the terminal type returned by the core network, thereby determining the terminal type of the target terminal. With the above process, the second base station may determine the terminal type of the target terminal, so that interference with the target resource block is reduced subsequently according to at least one of the verification result or a terminal type to which the target terminal belongs. The interference received by a cellular network base station from an illegal terminal may be precisely reduced, and unnecessary impact on a legal terminal may be avoided.

In the embodiments of the present disclosure, if the verification result about the legality of the target terminal is illegal, the second base station may directly release an established connection with the target terminal. Therefore, serving an illegal terminal is stopped, and the purpose of precisely reducing the interference received by a cellular network base station from the illegal terminal is achieved.

In the embodiments of the present disclosure, if the verification result about the legality of the target terminal is legal and the terminal type of the target terminal does not belong to the unmanned aerial vehicle type, the second base station may reduce interference with the target resource block by reducing power on the target resource block or allocating other resource blocks to the target terminal. With the above process, the interference with a target resource block is reduced, and an unnecessary impact on a legal terminal that does not belong to the unmanned aerial vehicle type may be avoided.

In the embodiments of the present disclosure, if the verification result about the legality of the target terminal is legal and the terminal type of the target terminal belongs to the unmanned aerial vehicle type, the second base station may perform corresponding processing according to a priority of a service currently carried by the target terminal when reducing the interference with the target resource block. If the priority of the service currently carried by the target terminal exceeds a preset priority, that is, when the target terminal currently carries a high-priority service, other resource blocks may be allocated to a terminal that is using the target resource block and does not belong to the unmanned aerial vehicle type, thereby reducing the interference with the target resource block without affecting the high-priority service currently carried by a terminal that belongs to the unmanned aerial vehicle type. If the priority of the service currently carried by the target terminal does not exceed the preset priority, that is, when the target terminal currently carries a low-priority service, interference with the target resource block may be reduced by reducing power on the target resource block or allocating other resource blocks to the target terminal. With the above process, the interference with a target resource block may be reduced according to a priority of a service currently carried by a legal terminal belonging to the unmanned aerial vehicle type, and when the interference with the target resource block is reduced, an unnecessary impact on the legal terminal belonging to the unmanned aerial vehicle type may be avoided.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The terms used in the present disclosure are for the purpose of describing particular embodiments only, and are not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It should be understood that although the terms first, second, third, etc. may be used in the present disclosure to describe various information, such information should not be limited to these terms. These terms are only used to distinguish the same type of information from each other. For example, without departing from the scope of the present disclosure, first information may also be called second information and, similarly, second information may also be called first information. For example, term "if" used here may be explained as "while" or "when" or "responsive to determining", which depends on the context.

Figure 1:
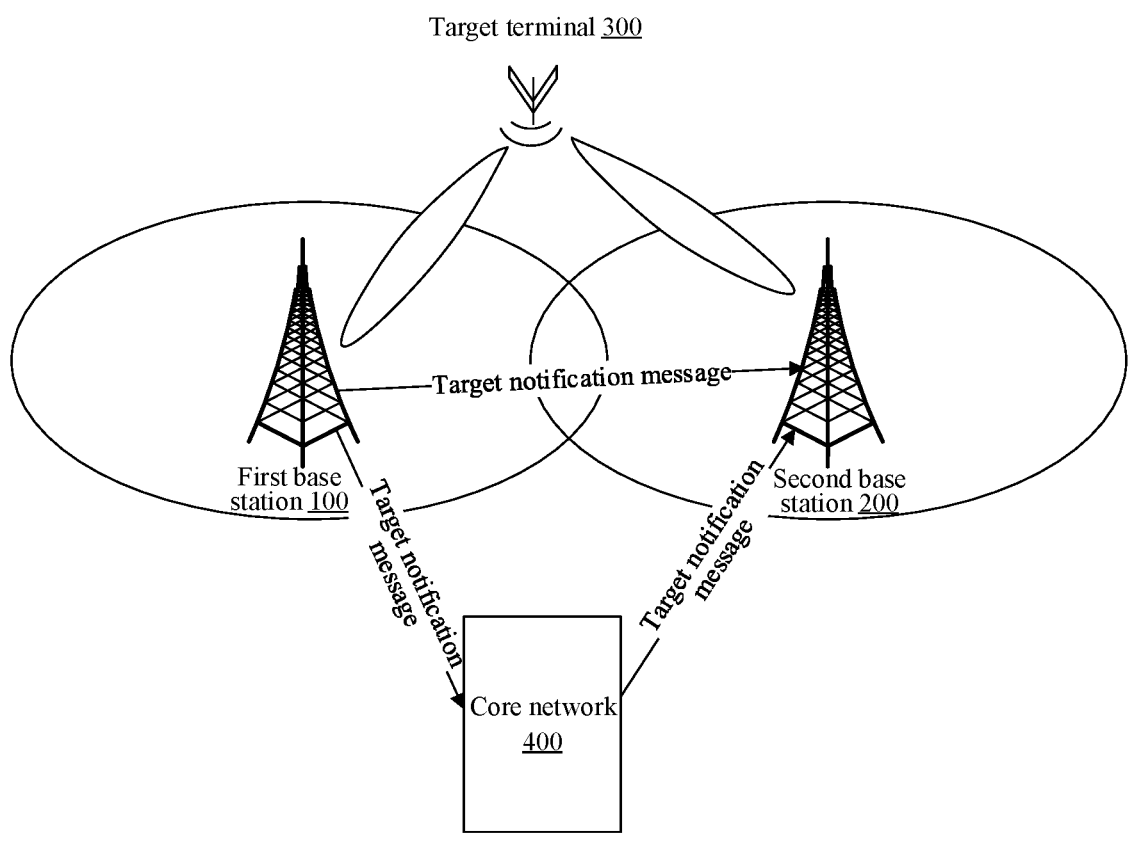
FIG. 1 is a schematic diagram of a scenario for controlling interference according to an exemplary embodiment.

An embodiment of the present disclosure provides a schematic diagram of a scenario for controlling interference. As illustrated in FIG. 1, a first base station 100 is interfered with by an unmanned aerial vehicle or a terminal similar to an unmanned aerial vehicle. The terminal similar to an unmanned aerial vehicle may be a terminal such as a mobile phone or an IPAD held by a user located in a higher floor of a skyscraper or sitting in a helicopter. The terminal similar to an unmanned aerial vehicle will behave like an unmanned aerial vehicle, and because of its high position, there are fewer obstacles between the terminal similar to the unmanned aerial vehicle and the base station, thereby causing large interference to the first base station 100.

The first base station 100 may determine a target resource block, from all resource blocks for data transmission, which is interfered with by the unmanned aerial vehicle or the terminal similar to an unmanned aerial vehicle. Further, the first base station 100 may generate a target notification message. The target notification message may carry resource block information of the target resource block and an interference indication identifier. The interference indication identifier may indicate that the current interference comes from the unmanned aerial vehicle or the terminal similar to an unmanned aerial vehicle. The first base station 100 sends a target notification message to a neighboring second base station 200. Or, the first base station 100 sends a target notification message to a core network 400, and then the core network 400 sends the target notification message to the second base station 200.

The second base station 200 may determine a target terminal 300 using the target resource block currently from terminals served by the second base station according to the target notification message, and the second base station 200 reduces interference with the target resource block according to at least one of a verification result or a terminal type to which the target terminal 300 belongs.

An interference control method provided by an embodiment of the present disclosure is first introduced below from a first base station interfered with by an unmanned aerial vehicle or a terminal similar to an unmanned aerial vehicle.

Figure 2:
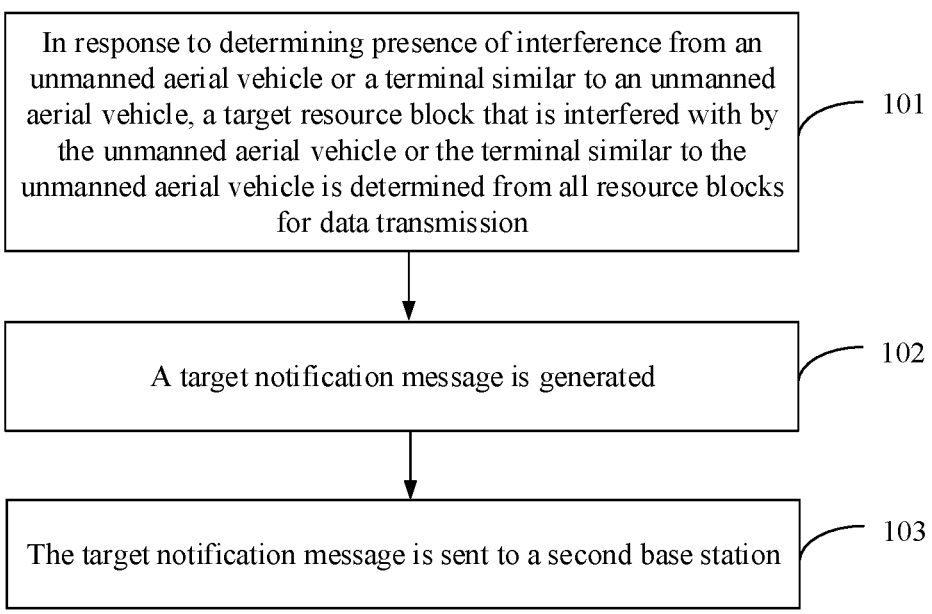
FIG. 2 is a flowchart of a method for controlling interference according to an exemplary embodiment.

Referring to FIG. 2, FIG. 2 is a flowchart of a method for controlling interference according to an exemplary embodiment. The method may be applied to a first base station, and includes the following operations.

At block 101, in response to determining presence of interference from an unmanned aerial vehicle or a terminal similar to an unmanned aerial vehicle, a target resource block that is interfered with by the unmanned aerial vehicle or the terminal similar to the unmanned aerial vehicle is determined from all resource blocks for data transmission.

At block 102, a target notification message is generated, where the target notification message carries resource block information of the target resource block and an interference indication identifier. The interference indication identifier indicates that the current interference comes from the unmanned aerial vehicle or the terminal similar to the unmanned aerial vehicle.

At block 103, the target notification message is sent to a second base station, so that after determining, based on the target notification message, a target terminal from terminals served by the second base station, the second base station verifies legality of the target terminal to obtain a verification result, and reduces interference with the target resource block according to at least one of the verification result or a terminal type to which the target terminal belongs. The second base station is a base station adjacent to the first base station, and the target terminal is a terminal that is using the target resource block.

In the above embodiment, a first base station that is interfered with by an unmanned aerial vehicle or a terminal similar to an unmanned aerial vehicle may determine, from all resource blocks for data transmission, a target resource block that is interfered with by the unmanned aerial vehicle or the terminal similar to the unmanned aerial vehicle. Further, a target notification message is generated, where the target notification message may carry interference identification information for indicating that the current interference comes from the unmanned aerial vehicle or the terminal similar to an unmanned aerial vehicle, and resource block information of the target resource block. The first base station sends the target notification message to a second base station adjacent thereto, so that after determining, based on the target notification message, a target terminal from terminals served by the second base station, the second base station may verify the legality of the target terminal to obtain a verification result, where the target terminal is a terminal using the target resource block currently. The second base station reduces interference with the target resource block according to at least one of the verification result or a terminal type to which the target terminal belongs. With the above process, the interference received by a cellular network base station from an illegal terminal may be precisely reduced, and unnecessary impact on a legal terminal may be avoided.

Figure 3:
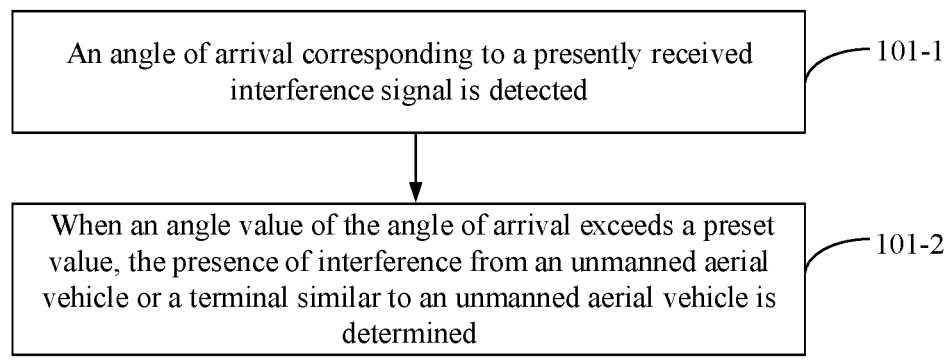
FIG. 3 is a flowchart of another method for controlling interference according to an exemplary embodiment.

For operation illustrated in block 101, the first base station may first determine whether it is interfered with by an unmanned aerial vehicle or a terminal similar to an unmanned aerial vehicle. Referring to FIG. 3, FIG. 3 is a flowchart of another method for controlling interference according to the embodiment illustrated in FIG. 2. The operation illustrated in block 101 may include the following actions.

At block 101-1, an angle of arrival corresponding to a currently received interference signal is detected. The angle of arrival is an angle between the interference signal and a horizontal plane.

Figure 4A:
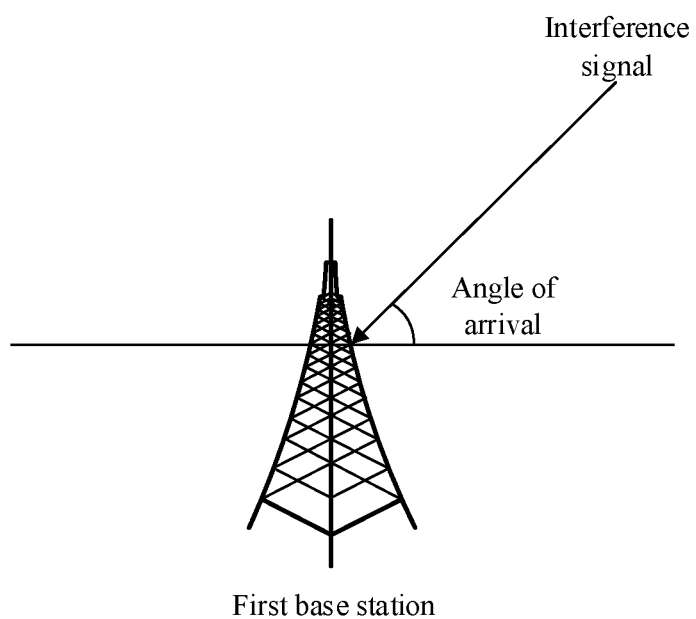
FIG. 4A is a first schematic diagrams of a scenario for controlling interference according to an exemplary embodiment.

In this action, the first base station may detect an angle of arrival corresponding to a currently received interference signal, where the angle of arrival is an angle between an interference signal and a horizontal plane. For example, as illustrated in FIG. 4A, an angle value less than 90 degrees may be used as an angle value of the angle of arrival.

At block 101-2, when an angle value of the angle of arrival exceeds a preset value, the presence of interference from an unmanned aerial vehicle or a terminal similar to an unmanned aerial vehicle is determined.

Figure 4B:
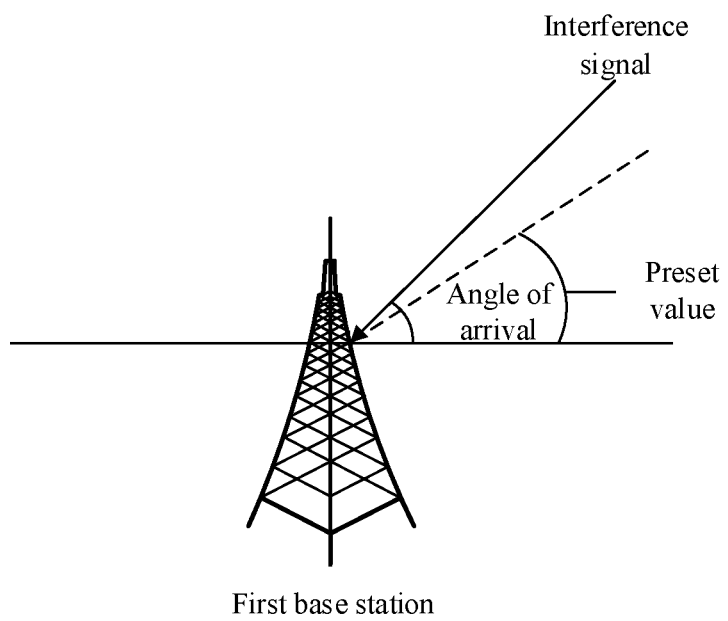
FIG. 4B is a second schematic diagram of a scenario for controlling interference according to an exemplary embodiment.

In the embodiment of the present disclosure, when an angle value of the angle of arrival exceeds a preset value, for example, as illustrated in FIG. 4B, it is determined that there is an interference from an unmanned aerial vehicle or a terminal similar to an unmanned aerial vehicle.

Of course, the embodiment of the present disclosure does not limit a manner of determining the presence of interference from an unmanned aerial vehicle or a terminal similar to an unmanned aerial vehicle based on an angle of arrival, other manners capable of determining the presence of interference with the first base station from an unmanned aerial vehicle or a terminal similar to an unmanned aerial vehicle fall within the scope of protection of the embodiment of the present disclosure.

In the above embodiment, the first base station may detect an angle of arrival corresponding to a presently received interference signal, and when an angle value of the angle of arrival exceeds a preset value, the presence of interference from an unmanned aerial vehicle or a terminal similar to an unmanned aerial vehicle may be determined. With the above process, it may be determined whether a base station is interfered with by an unmanned aerial vehicle or a terminal similar to an unmanned aerial vehicle, and the availability is high.

When the presence of interference from an unmanned aerial vehicle or a terminal similar to an unmanned aerial vehicle is determined, the first base station may determine a target resource block that is interfered with by the unmanned aerial vehicle or the terminal similar to an unmanned aerial vehicle from all resource blocks for data transmission. Since the unmanned aerial vehicle or the terminal similar to an unmanned aerial vehicle is located at a higher position and there are fewer obstacles between the unmanned aerial vehicle or the terminal similar to an unmanned aerial vehicle and the first base station, the generated signal to noise ratio is small. In the embodiments of the present disclosure, the first base station may detect signal to noise ratios corresponding to all resource blocks for data transmission, and select, according to a descending order of the signal to noise ratios, at least one resource block as a target resource block that is interfered with by the unmanned aerial vehicle or the terminal similar to an unmanned aerial vehicle. The applicability is high.

For operation illustrated in block 102, the first base station may generate a target notification message according to the related art. The target notification message may carry resource block information of the target resource block and an interference indication identifier. The interference indication identifier indicates that the current interference comes from the unmanned aerial vehicle or the terminal similar to an unmanned aerial vehicle.

For operation illustrated in block 103, the first base station may directly send the target notification message to a neighboring second base station through an interface between base stations. In a 4G network, the interface between base stations is an X2 interface, and in a 5G network, the interface between base stations is an Xn interface.

If there is no direct interface between base stations, the first base station may first send the target notification message to a core network, and then the core network forwards the target notification message to the second base station adjacent to the first base station. The first base station may send the target notification message to the core network through an interface between the first base station and the core network. In the 4G network, an interface between a base station and a core network is an Si interface. In the 5G network, the interface between a base station and a core network is an NG interface. The core network sends the target notification message to the second base station through the interface between the second base station and the core network.

The second base station, in response to receiving the target notification message, determines a target terminal from terminals served by itself. The target terminal is a terminal using the target resource block currently. Further, the second base station may verify the legality of the target terminal to obtain a verification result, and reduce interference with the target resource block according to at least one of the verification result or a terminal type to which the target terminal belongs.

In the above embodiment, the first base station may directly send a generated target notification message to the second base station through an interface between the base stations. Or, the first base station may send the target notification message to a core network, and the core network forwards the target notification message to the second base station. Therefore, the second base station may reduce interference with the target resource block according to at least one of the verification result about the legality of the target terminal or a terminal type to which the target terminal belongs, so that the interference received by a cellular network base station from an illegal terminal may be precisely reduced, and unnecessary impact on a legal terminal may be avoided.

An interference control method provided by an embodiment of the present disclosure is introduced below from a second base station adjacent to the first base station.

Figure 5:
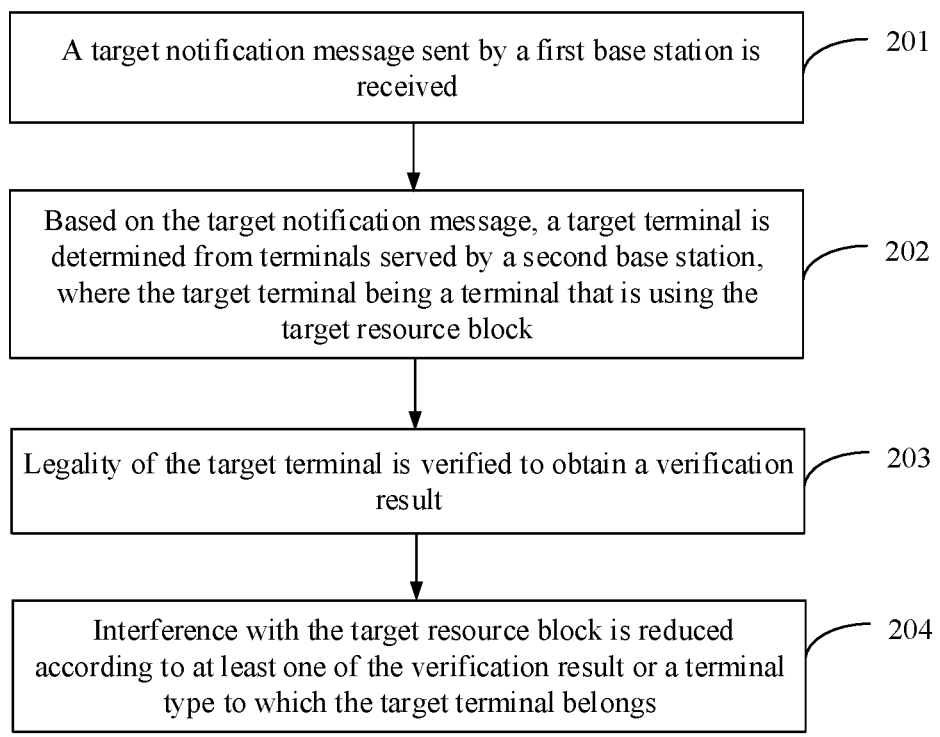
FIG. 5 is a flowchart of another method for controlling interference according to an exemplary embodiment.

Referring to FIG. 5, FIG. 5 is a flowchart of another method for controlling interference according to an exemplary embodiment. The method may be applied to a second base station, and includes the following operations.

At block 201, a target notification message sent by a first base station is received. The first base station is a base station adjacent to the second base station and interfered with by an unmanned aerial vehicle or a terminal similar to an unmanned aerial vehicle. The target notification message carries resource block information of the target resource block of the first base station that is interfered with by the unmanned aerial vehicle or the terminal similar to an unmanned aerial vehicle and an interference indication identifier. The interference indication identifier indicates that the current interference comes from the unmanned aerial vehicle or the terminal similar to an unmanned aerial vehicle.

At block 202, a target terminal is determined based on the target notification message from terminals served by the second base station. The target terminal is a terminal using the target resource block currently.

At block 203, legality of the target terminal is verified to obtain a verification result.

At block 204, interference with the target resource block is reduced according to at least one of the verification result or a terminal type to which the target terminal belongs.

In the above embodiment, after receiving the target notification message sent by the first base station, the second base station may determine, based on the target notification message, a target terminal from terminals served by itself, the target terminal being a terminal using the target resource block currently. Further, the legality of the target terminal is verified to obtain a verification result, thereby reducing interference with the target resource block according to at least one of the verification result or a terminal type to which the target terminal belongs. With the above process, the interference with a cellular network base station from an illegal terminal may be precisely reduced, and unnecessary impact on a legal terminal may be avoided.

For operation illustrated in block 201, if there is an interface between base stations, the second base station may directly receive the target notification message sent by the first base station through the interface between base stations. The applicability is high.

If there is no interface between base stations, the first base station may send the target notification message to a core network through an interface between a base station and a core network, then the core network forwards the target notification message to the second base station through an interface between a base station and a core network, and the second base station receives the target notification message. The applicability is high.

The target notification message is a message generated by the first base station when it is interfered with by an unmanned aerial vehicle or a terminal similar to an unmanned aerial vehicle. The message carries resource block information of the target resource block of the first base station that is interfered with by the unmanned aerial vehicle or the terminal similar to an unmanned aerial vehicle and an interference indication identifier. The interference indication identifier is used to indicate that the current interference comes from the unmanned aerial vehicle or the terminal similar to an unmanned aerial vehicle.

For operation illustrated in block 202, the second base station may determine a target terminal using the target resource block currently from terminals served currently according to the related art.

For example, if the first base station is interfered with, on a target resource block RB4, by an unmanned aerial vehicle or a terminal similar to an unmanned aerial vehicle, the second base station may determine a target terminal using RB4 currently from terminals served by itself.

For operation illustrated in block 203, the second base station may verify the legality of the target terminal to obtain a verification result.

Figure 6:
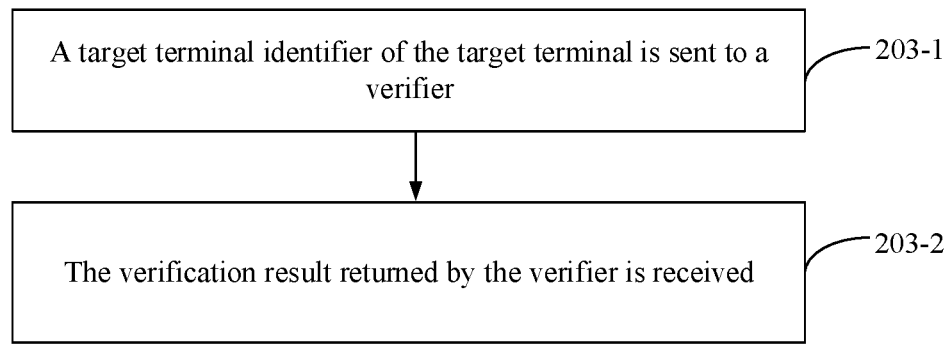
FIG. 6 is a flowchart of another method for controlling interference according to an exemplary embodiment.

In some embodiments, referring to FIG. 6, FIG. 6 is a flowchart of another method for controlling interference according to the embodiment illustrated in FIG. 5. Operation illustrated in block 203 may include the following actions.

At block 203-1, a target terminal identifier of the target terminal is sent to a verifier.

In this block, the second base station may send a target terminal identifier of the target terminal to a verifier. The verifier may be a core network or a verification server.

A legal identification information list is pre-stored on the verifier. The legal identification information list includes identification information corresponding to all registered terminals. The registered terminal may be an unmanned aerial vehicle, a mobile phone, an IPAD, or the like. The verifier may search for the target terminal identifier in the legal identification information list.

If the target terminal identifier is included in the legal identification information list, the verifier determines the verification result as legal, and otherwise, as illegal.

At block 203-2, the verification result returned by the verifier is received.

In this block, the second base station directly receives the verification result returned by the verifier.

In the above embodiment, when needing to obtain a verification result about the legality of a target terminal, the second base station may send a target terminal identifier of the target terminal to a verifier, the verifier may be a core network or a verification server, and the verifier searches for the target terminal identifier in a legal identification information list. If the target terminal identifier is present in the legal identification information list, the verifier determines the verification result as legal, and otherwise, as illegal. The second base station receives the verification result returned by the verifier, and determines the legality of the target terminal. The implementation is simple, and the accuracy of subsequent reduction of interference with a target resource block is ensured.

Figure 7:
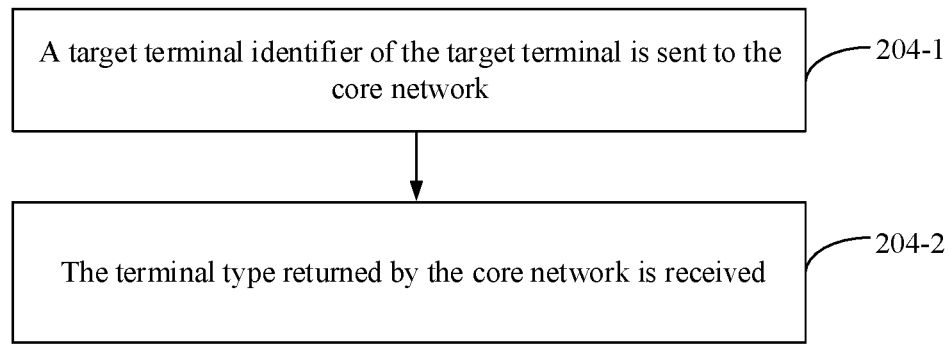
FIG. 7 is a flowchart of another method for controlling interference according to an exemplary embodiment.

For operation illustrated in block 204, before reducing interference with the target resource block, the second base station also needs to determine a terminal type of the target terminal. In some embodiments, referring to FIG. 7, FIG. 7 is a flowchart of another method for controlling interference according to the embodiment illustrated in FIG. 5. Operation illustrated in block 204 may include the following actions.

At block 204-1, a target terminal identifier of the target terminal is sent to the core network, so that the core network determines a terminal type corresponding to the target terminal identifier according to a pre-stored correspondence between a terminal identifier and a terminal type.

In this block, the second base station may send the determined target terminal identifier of the target terminal to a core network through an interface between a base station and a core network. The core network may pre-store a correspondence between a terminal identifier and a terminal type, so that after receiving a target terminal identifier, the core network may determine a terminal type corresponding to the target terminal identifier according to the correspondence. That is, the core network may determine a terminal type of the target terminal.

At block 204-2, the terminal type returned by the core network is received.

In this block, the second base station may directly receive a terminal type returned by the core network. The terminal type is the terminal type of the target terminal. The terminal type of the target terminal may be an unmanned aerial type or other types such as a mobile phone or an IPAD.

In the above embodiment, the second base station may send a target terminal identifier of a target terminal to a core network, and the core network determines a terminal type corresponding to the target terminal identifier according to a pre-stored correspondence between a terminal identifier and a terminal type. Further, the second base station receives the terminal type returned by the core network, thereby determining the terminal type of the target terminal. With the above process, the second base station may determine the terminal type of the target terminal, so that interference with the target resource block is reduced subsequently according to at least one of the verification result or a terminal type to which the target terminal belongs. The interference received by a cellular network base station from an illegal terminal may be precisely reduced, and unnecessary impact on a legal terminal may be avoided.

The second base station obtains a verification result about the legality of the target terminal according to operation illustrated in block 203, and determines the terminal type of the target terminal in this block. At this time, interference with the target resource block may be reduced according to at least one of the verification result or the terminal type.

If the verification result is illegal, regardless of the terminal type of the target terminal, the second base station may stop serving the target terminal, and may, in some embodiments, release an established connection with the target terminal.

In the above embodiment, if the verification result about the legality of the target terminal is illegal, the second base station may directly release an established connection with the target terminal. Therefore, serving an illegal terminal is stopped, and the purpose of precisely reducing the interference with a cellular network base station from the illegal terminal is achieved.

If the verification result is legal and the terminal type does not belong to an unmanned aerial vehicle type, it indicates that the target terminal is a legal terminal similar to an unmanned aerial vehicle, such as a mobile phone or an IPAD held by a user located in a higher floor of a skyscraper or sitting in a helicopter.

At this time, the second base station may reduce power on the target resource block, thereby reducing interference of the target terminal to the target resource block. Or, the second base station may also allocate other resource blocks to the target terminal, thereby also reducing interference of the target terminal to the target resource block.

For example, if the first base station is interfered with, on target resource blocks RB4 and RB5, by an unmanned aerial vehicle or a terminal similar to an unmanned aerial vehicle, the second base station may reduce power on RB4 and RB5, or no longer serve the target terminal through RB4 and RB5, but serve the target terminal through resources corresponding to other resource blocks such as RB1 and RB2.

In the above embodiment, if the verification result about the legality of the target terminal is legal and the terminal type of the target terminal does not belong to an unmanned aerial vehicle type, the second base station may reduce interference with the target resource block by reducing power on the target resource block or allocating other resource blocks to the target terminal. With the above process, the interference with a target resource block is reduced, and an unnecessary impact on a legal terminal that does not belong to an unmanned aerial vehicle type may be avoided.

When the verification result is legal and the terminal type belongs to the unmanned aerial vehicle type, that is, the target terminal is a legal unmanned aerial vehicle, the second base station may first judge whether a priority of a service currently carried by the target terminal exceeds a preset priority according to the related art.

When the priority of the service currently carried by the target terminal exceeds the preset priority, it indicates that the service currently carried by the target terminal is important. For example, if a disaster relief service with a higher priority is currently carried, the service on the target terminal needs to be guaranteed. Therefore, other resource blocks may be allocated to a terminal that is using the target resource block and does not belong to the unmanned aerial vehicle type, thereby reducing the interference with the target resource block.

For example, the first base station is interfered with, on target resource blocks RB4 and RB5, by an unmanned aerial vehicle or a terminal similar to an unmanned aerial vehicle, and the target terminal is a legal unmanned aerial vehicle, so other resource blocks such as RB1 and RB2 may be allocated to a terminal that is using RB4 and RB5 and does not belong to the unmanned aerial vehicle type, such as a mobile phone or an IPAD.

When the priority of the service currently carried by the target terminal does not exceed the preset priority, it indicates that the priority of the service carried by the target terminal currently is low, so that interference with the target resource block may be reduced by reducing power on the target resource block or allocating other resource blocks to the target terminal.

In the above embodiment, if the verification result about the legality of the target terminal is legal and the terminal type of the target terminal belongs to the unmanned aerial vehicle type, the second base station may perform corresponding processing according to a priority of a service currently carried by the target terminal when reducing the interference with the target resource block. If the priority of the service currently carried by the target terminal exceeds a preset priority, that is, when the target terminal currently carries a high-priority service, other resource blocks may be allocated to a terminal that is using the target resource block currently and does not belong to the unmanned aerial vehicle type, thereby reducing the interference with the target resource block without affecting the high-priority service currently carried by a terminal that belongs to the unmanned aerial vehicle type. If the priority of the service currently carried by the target terminal does not exceed the preset priority, that is, when the target terminal currently carries a low-priority service, interference with the target resource block may be reduced by reducing power on the target resource block or allocating other resource blocks to the target terminal. With the above process, the interference with a target resource block may be correspondingly reduced according to a priority of a service currently carried by a legal terminal belonging to the unmanned aerial vehicle type, and when the interference with the target resource block is reduced, an unnecessary impact on the legal terminal belonging to the unmanned aerial vehicle type may be avoided.

Figure 8:
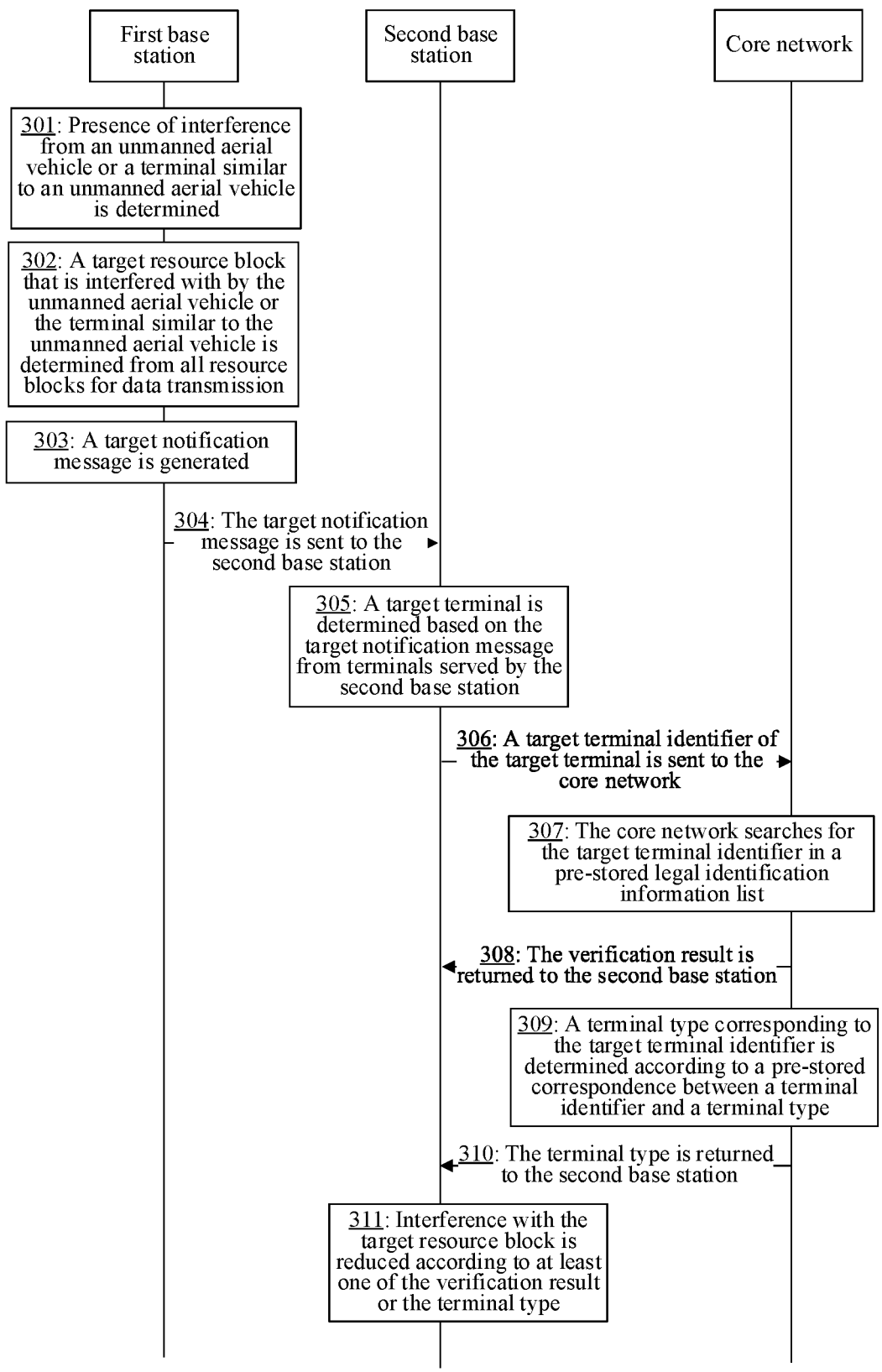
FIG. 8 is a flowchart of another method for controlling interference according to an exemplary embodiment.

Referring to FIG. 8, FIG. 8 is a flowchart of another method for controlling interference according to an exemplary embodiment. The method includes the following operations.

At block 301, a first base station determines presence of interference from an unmanned aerial vehicle or a terminal similar to an unmanned aerial vehicle.

At block 302, the first base station determines a target resource block, from all resource blocks for data transmission, which is interfered with by the unmanned aerial vehicle or the terminal similar to an unmanned aerial vehicle.

At block 303, the first base station generates a target notification message.

The target notification message carries resource block information of the target resource block and an interference indication identifier. The interference indication identifier is used to indicate that the current interference comes from the unmanned aerial vehicle or the terminal similar to an unmanned aerial vehicle.

At block 304, the first base station sends the target notification message to a second base station.

In this block, the first base station may directly send the target notification message to a second base station. The first base station may also send the target notification message to a core network, and the core network may forward the target notification message to the second base station.

At block 305, the second base station determines, based on the target notification message, a target terminal from terminals served by itself.

The target terminal is a terminal using the target resource block currently.

At block 306, the second base station sends a target terminal identifier of the target terminal to a core network.

At block 307, the core network searches for the target terminal identifier in a pre-stored legal identification information list.

If the target terminal identifier is included in the legal identification information list, a verification result is determined as legal, and otherwise, the verification result is determined as illegal.

At block 308, the core network returns the verification result to the second base station.

Of course, the second base station may send the target terminal identifier to a verification server to obtain a verification result.

At block 309, the core network determines a terminal type corresponding to the target terminal identifier according to a pre-stored correspondence between a terminal identifier and a terminal type.

At block 310, the core network returns the terminal type to the second base station.

At block 311, the second base station reduces interference with the target resource block according to at least one of the verification result or the terminal type.

In the above embodiment, the first base station may send a target notification message to the second base station when being interfered with by an unmanned aerial vehicle or a terminal similar to an unmanned aerial vehicle, and the second base station determines a target terminal according to the target notification message and verifies the legality of the target terminal. Further, the second base station reduces interference with a target resource block according to at least one of a verification result about the legality of the target terminal or a terminal type, so that the interference received by a cellular network base station from an illegal terminal may be precisely reduced, and unnecessary impact on a legal terminal may be avoided.

For simple description, each of the above method embodiments is expressed as a combination of a series of operations, but those skilled in the art should know that the present disclosure is not limited to the described operation sequence because some operations may be executed in other sequences or at the same time according to the present disclosure.

Second, those skilled in the art should also know that all the embodiments described in the specification are optional embodiments and involved operations and modules are not always required by the present disclosure.

Corresponding to the above application function implementation method embodiments, the present disclosure also provides embodiments of an application function implementation device and a corresponding terminal.

Figure 9:
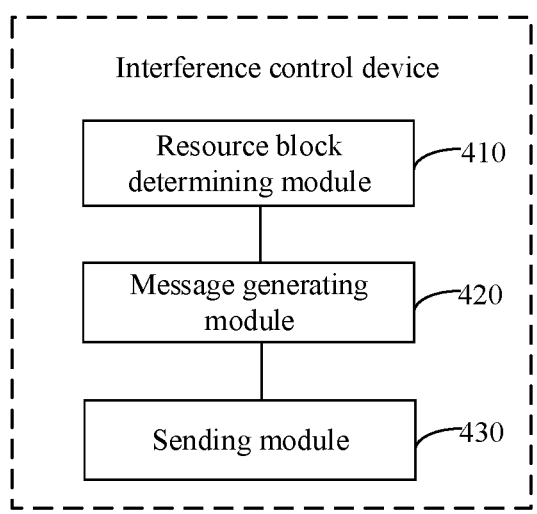
FIG. 9 is a block diagram of a device for controlling interference according to an exemplary embodiment.

FIG. 9 is a block diagram of a device for controlling interference according to an exemplary embodiment. The device is applied to a first base station. The device includes a resource block determining module 410, a message generating module 420, and a sending module 430.

The resource block determining module 410 is configured to determine, in response to determining presence of interference from an unmanned aerial vehicle or a terminal similar to an unmanned aerial vehicle, a target resource block, from all resource blocks for data transmission, which is interfered with by the unmanned aerial vehicle or the terminal similar to an unmanned aerial vehicle.

The message generating module 420 is configured to generate a target notification message. The target notification message carries resource block information of the target resource block and an interference indication identifier. The interference indication identifier is used to indicate that the current interference comes from the unmanned aerial vehicle or the terminal similar to an unmanned aerial vehicle.

The sending module 430 is configured to send the target notification message to a second base station, so that after determining, based on the target notification message, a target terminal from terminals served by the second base station, the second base station verifies the legality of the target terminal to obtain a verification result, and reduces interference with the target resource block according to at least one of the verification result or a terminal type to which the target terminal belongs. The second base station is a base station adjacent to the first base station, and the target terminal is a terminal that is using the target resource block.

In the above embodiment, a first base station that is interfered with by an unmanned aerial vehicle or a terminal similar to an unmanned aerial vehicle may determine a target resource block that is interfered with by the unmanned aerial vehicle or the terminal similar to an unmanned aerial vehicle from all resource blocks for data transmission. Further, a target notification message is generated, where the target notification message may carry interference identification information for indicating that the current interference comes from the unmanned aerial vehicle or the terminal similar to an unmanned aerial vehicle, and resource block information of the target resource block. The first base station sends the target notification message to a second base station adjacent thereto, so that after determining, based on the target notification message, a target terminal from terminals served by the second base station, the second base station may verify the legality of the target terminal to obtain a verification result, where the target terminal is a terminal using the target resource block currently. The second base station reduces interference with the target resource block according to at least one of the verification result or a terminal type to which the target terminal belongs. The interference received by a cellular network base station from an illegal terminal may be precisely reduced, and unnecessary impact on a legal terminal may be avoided.

Figure 10:
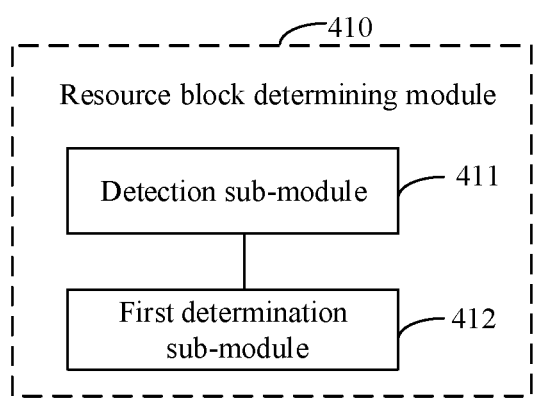
FIG. 10 is a block diagram of another device for controlling interference according to an exemplary embodiment.

Referring to FIG. 10, FIG. 10 is a block diagram of another device for controlling interference from an operable device based on the embodiment illustrated in FIG. 9. The resource block determining module 410 includes a detection sub-module 411 and a first determination sub-module 412.

The detection sub-module 411 is configured to detect an angle of arrival corresponding to a currently received interference signal. The angle of arrival is an angle between the interference signal and a horizontal plane.

The first determination sub-module 412 is configured to determine, when an angle value of the angle of arrival exceeds a preset value, the presence of interference from an unmanned aerial vehicle or a terminal similar to an unmanned aerial vehicle.

In the above embodiment, the first base station may detect an angle of arrival corresponding to a currently received interference signal, and if an angle value of the angle of arrival exceeds a preset value, the presence of interference from an unmanned aerial vehicle or a terminal similar to an unmanned aerial vehicle may be determined. It may be determined whether a base station is interfered with by an unmanned aerial vehicle or a terminal similar to an unmanned aerial vehicle, and the availability is high.

Figure 11:
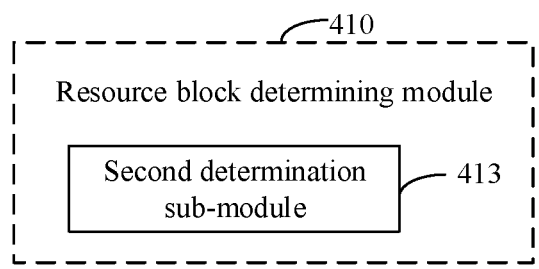
FIG. 11 is a block diagram of another device for controlling interference according to an exemplary embodiment.

Referring to FIG. 11, FIG. 11 is a block diagram of another device for controlling interference from an operable device based on the embodiment illustrated in FIG. 9. The resource block determining module 410 includes a second determination sub-module 413.

The second determination sub-module 413 is configured to detect signal to noise ratios corresponding to all resource blocks for data transmission, and select, according to a descending order of the signal to noise ratios, at least one resource block as a target resource block that is interfered with by the unmanned aerial vehicle or the terminal similar to an unmanned aerial vehicle.

In the above embodiment, the first base station may detect signal to noise ratios corresponding to all resource blocks for data transmission, and select according to a descending order of the signal to noise ratios, at least one resource block as a target resource block that is interfered with by the unmanned aerial vehicle or the terminal similar to an unmanned aerial vehicle. A resource block with a higher signal-to-noise ratio may be used as a target resource block that is interfered with by the unmanned aerial vehicle or the terminal similar to an unmanned aerial vehicle, and the availability is high.

Figure 12:
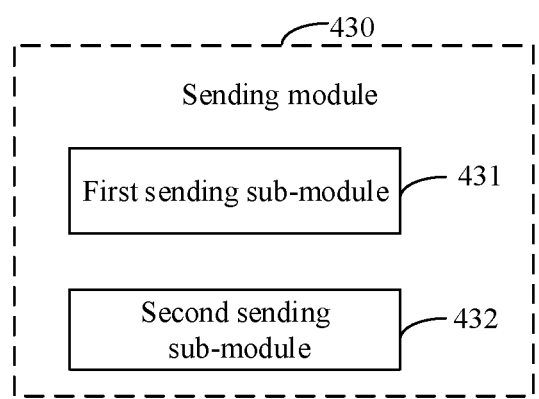
FIG. 12 is a block diagram of another device for controlling interference according to an exemplary embodiment.

Referring to FIG. 12, FIG. 12 is a block diagram of another device for controlling interference from an operable device based on the embodiment illustrated in FIG. 9. The sending module 430 may include a first sending sub-module 431 or a second sending sub-module 432.

The first sending sub-module 431 is configured to send the target notification message directly to the second base station.

The second sending sub-module 432 is configured to send the target notification message to a core network, so that the core network forwards the target notification message to the second base station.

In the above embodiment, the first base station may directly send a generated target notification message to the second base station through an interface between the base stations. Or, the first base station may send the target notification message to a core network, and the core network forwards the target notification message to the second base station. Therefore, the second base station may reduce interference with the target resource block according to at least one of the verification result about the legality of the target terminal or a terminal type to which the target terminal belongs, so that the interference received by a cellular network base station from an illegal terminal may be precisely reduced, and unnecessary impact on a legal terminal may be avoided.

Figure 13:
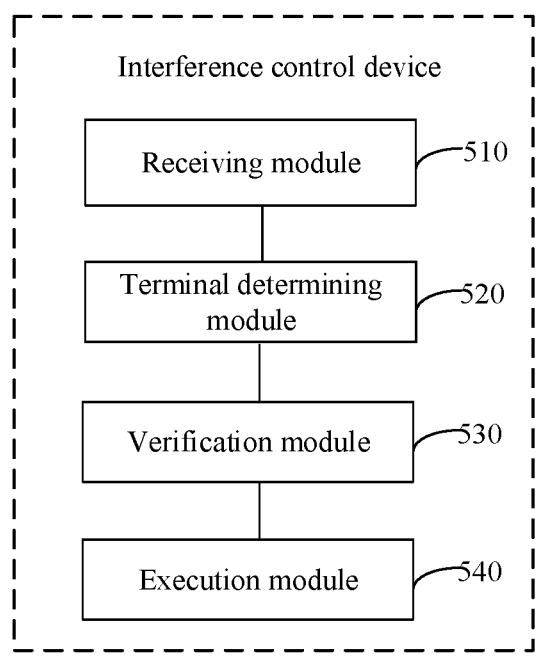
FIG. 13 is a block diagram of another device for controlling interference according to an exemplary embodiment.

FIG. 13 is a block diagram of another device for controlling interference according to an exemplary embodiment. The device is applied to a second base station. The device includes a receiving module 510, a terminal determining module 520, a verification module 530, and an execution module 540.

The receiving module 510 is configured to receive a target notification message sent by a first base station. The first base station is a base station adjacent to the second base station and interfered with by an unmanned aerial vehicle or a terminal similar to an unmanned aerial vehicle. The target notification message carries resource block information of a target resource block of the first base station that is interfered with by the unmanned aerial vehicle or the terminal similar to the unmanned aerial vehicle and an interference indication identifier. The interference indication identifier is used to indicate that the current interference comes from the unmanned aerial vehicle or the terminal similar to the unmanned aerial vehicle.

The terminal determining module 520 is configured to determine, based on the target notification message, a target terminal from terminals served by itself, where the target terminal is a terminal using the target resource block currently.

The verification module 530 is configured to verify legality of the target terminal to obtain a verification result.

The execution module 540 is configured to reduce interference with the target resource block according to at least one of the verification result or a terminal type to which the target terminal belongs.

In the above embodiment, after receiving the target notification message sent by the first base station, the second base station may determine, based on the target notification message, a target terminal from terminals served by itself, the target terminal being a terminal using the target resource block currently. Further, the legality of the target terminal is verified to obtain a verification result, thereby reducing interference with the target resource block according to at least one of the verification result or a terminal type to which the target terminal belongs. With the embodiments of the present disclosure, the interference received by a cellular network base station from an illegal terminal may be precisely reduced, and unnecessary impact on a legal terminal may be avoided.

Figure 14:
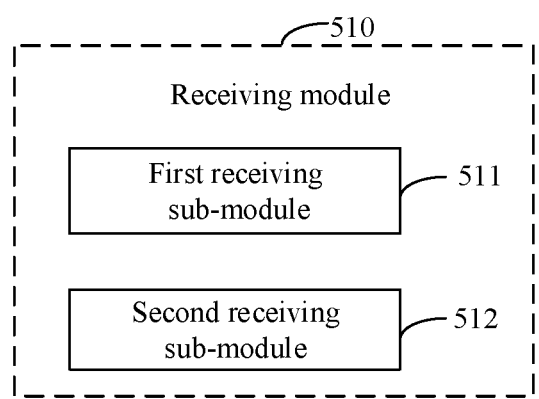
FIG. 14 is a block diagram of another device for controlling interference according to an exemplary embodiment.

Referring to FIG. 14, FIG. 14 is a block diagram of another device for controlling interference from an operable device based on the embodiment illustrated in FIG. 13. The receiving module 510 includes a first receiving sub-module 511 or a second receiving sub-module 512.

The first receiving sub-module 511 is configured to receive a target notification message directly sent by the first base station.

The second receiving sub-module 512 is configured to receive a target notification message forwarded by a core network, where the target notification message is sent to the core network by the first base station.

In the above embodiment, the second base station may directly receive the target notification message sent by the first base station or receive the target notification message forwarded by the core network, and the availability is high.

Figure 15:
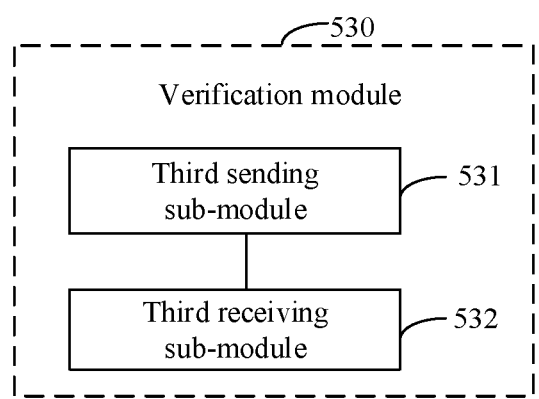
FIG. 15 is a block diagram of another device for controlling interference according to an exemplary embodiment.

Referring to FIG. 15, FIG. 15 is a block diagram of another device for controlling interference from an operable device based on the embodiment illustrated in FIG. 13. The verification module 530 includes a third sending sub-module 531 and a third receiving sub-module 532.

The third sending sub-module 531 is configured to send a target terminal identifier of the target terminal to a verifier, so that the verifier searches for the target terminal identifier in a pre-stored legal identification information list, and when the legal identification information list includes the target terminal identifier, the verification result is determined to be legal, and otherwise the verification result is determined to be illegal, where the legal identification information list includes identification information corresponding to all registered terminals.

The third receiving sub-module 532 is configured to receive the verification result returned by the verifier.

The verifier is the core network or a verification server.

In the above embodiment, when needing to obtain a verification result about the legality of a target terminal, the second base station may send a target terminal identifier of the target terminal to a verifier, the verifier may be a core network or a verification server, and the verifier searches for the target terminal identifier in a legal identification information list. If the target terminal identifier is present in the legal identification information list, the verifier determines the verification result as legal, and otherwise, as illegal. The second base station receives the verification result returned by the verifier, so that the legality of the target terminal may be determined. The implementation is simple, and the accuracy of subsequent reduction of interference to a target resource block is ensured.

Figure 16:
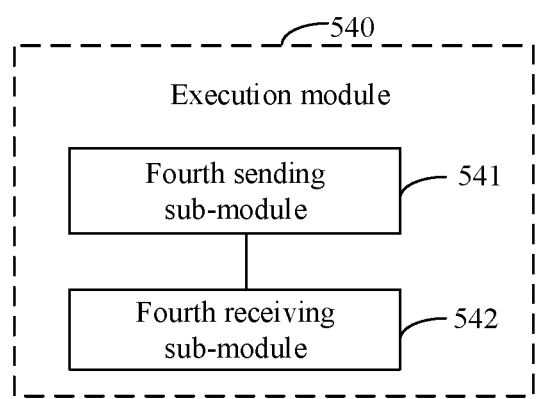
FIG. 16 is a block diagram of another device for controlling interference according to an exemplary embodiment.

Referring to FIG. 16, FIG. 16 is a block diagram of another device for controlling interference from an operable device based on the embodiment illustrated in FIG. 13. The execution module 540 includes a fourth sending sub-module 541 and a fourth receiving sub-module 542.

The fourth sending sub-module 541 is configured to send a target terminal identifier of the target terminal to the core network, so that the core network determines a terminal type corresponding to the target terminal identifier according to a pre-stored correspondence between a terminal identifier and a terminal type.

The fourth receiving sub-module 542 is configured to receive the terminal type returned by the core network.

In the above embodiment, the second base station may send a target terminal identifier of a target terminal to a core network, and the core network determines a terminal type corresponding to the target terminal identifier according to a pre-stored correspondence between a terminal identifier and a terminal type. Further, the second base station receives the terminal type returned by the core network, thereby determining the terminal type of the target terminal. With the embodiment of the present disclosure, the second base station may determine the terminal type of the target terminal, so that interference with the target resource block is reduced subsequently according to at least one of the verification result or a terminal type to which the target terminal belongs. The interference received by a cellular network base station from an illegal terminal may be precisely reduced, and unnecessary impact on a legal terminal may be avoided.

Figure 17:
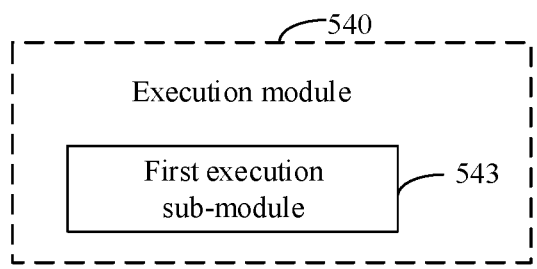
FIG. 17 is a block diagram of another device for controlling interference according to an exemplary embodiment.

Referring to FIG. 17, FIG. 17 is a block diagram of another device for controlling interference from an operable device based on the embodiment illustrated in FIG. 13. The execution module 540 includes a first execution sub-module 543.

The first execution sub-module 543 is configured to release, when the verification result is illegal, an established connection with the target terminal.

In the above embodiment, if the verification result about the legality of the target terminal is illegal, the second base station may directly release an established connection with the target terminal. Therefore, serving an illegal terminal is stopped, and the purpose of precisely reducing the interference received by a cellular network base station from the illegal terminal is achieved.

Figure 18:
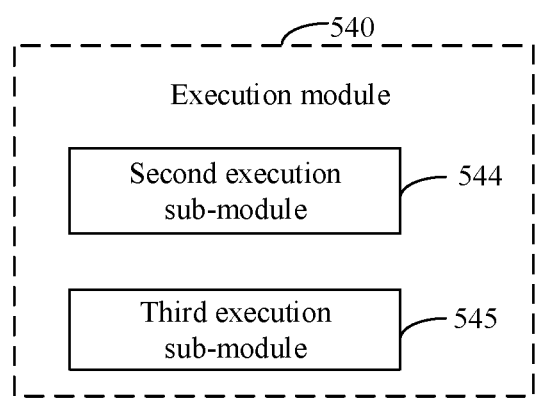
FIG. 18 is a block diagram of another device for controlling interference according to an exemplary embodiment.

Referring to FIG. 18, FIG. 18 is a block diagram of another device for controlling interference from an operable device based on the embodiment illustrated in FIG. 13. The execution module 540 includes a second execution sub-module 544 or a third execution sub-module 545.

The second execution sub-module 544 is configured to reduce, when the verification result is legal and the terminal type does not belong to an unmanned aerial vehicle type, power on the target resource block.

The third execution sub-module 545 is configured to allocate, when the verification result is legal and the terminal type does not belong to an unmanned aerial vehicle type, other resource blocks to the target terminal.

In the above embodiment, if the verification result about the legality of the target terminal is legal and the terminal type of the target terminal does not belong to the unmanned aerial vehicle type, the second base station may reduce interference with the target resource block by reducing power on the target resource block or allocating other resource blocks to the target terminal. With the embodiment of the present disclosure, the interference with a target resource block is reduced, and an unnecessary impact on a legal terminal that does not belong to the unmanned aerial vehicle type may be avoided.

Figure 19:
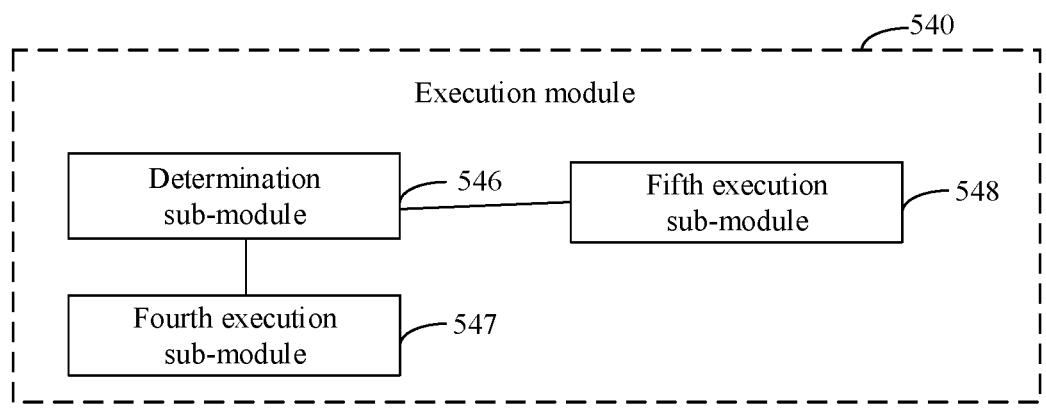
FIG. 19 is a block diagram of another device for controlling interference according to an exemplary embodiment.

Referring to FIG. 19, FIG. 19 is a block diagram of another device for controlling interference from an operable device based on the embodiment illustrated in FIG. 13. The execution module 540 includes a judgment sub-module 546, a fourth execution sub-module 547, and a fifth execution sub-module 548.

The judgment sub-module 546 is configured to judge, when the verification result is legal and the terminal type belongs to the unmanned aerial vehicle type, whether a priority of a service currently carried by the target terminal exceeds a preset priority.

The fourth execution sub-module 547 is configured to allocate, if the priority of the service currently carried by the target terminal exceeds the preset priority, other resource blocks to a terminal that is using the target resource block and does not belong to the unmanned aerial vehicle type.

The fifth execution sub-module 548 is configured to reduce, if the priority of the service currently carried by the target terminal does not exceed the preset priority, power on the target resource block, and allocate other resource blocks to the target terminal.

In the above embodiment, the interference with a target resource block may be correspondingly reduced according to a priority of a service currently carried by a legal terminal belonging to the unmanned aerial vehicle type, and when the interference to the target resource block is reduced, an unnecessary impact on the legal terminal belonging to the unmanned aerial vehicle type may be avoided.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a computer readable storage medium, which stores a computer program, the computer program being configured to execute any interference control method applied to a first base station side.

Correspondingly, the present disclosure also provides a computer readable storage medium, which stores a computer program, the computer program being configured to execute any interference control method applied to a second base station side.

Correspondingly, the present disclosure also provides a device for controlling interference. The device is applied to a first base station and includes:

a processor; and a memory configured to store instructions executable for the processor, where the processor is configured to:

determine, in response to determining presence of interference from an unmanned aerial vehicle or a terminal similar to an unmanned aerial vehicle, a target resource block, from all resource blocks for data transmission, which is interfered with by the unmanned aerial vehicle or the terminal similar to an unmanned aerial vehicle;

generate a target notification message, where the target notification message carries resource block information of the target resource block and an interference indication identifier, and the interference indication identifier is used to indicate that the current interference comes from the unmanned aerial vehicle or the terminal similar to an unmanned aerial vehicle; and send the target notification message to a second base station, so that after determining, based on the target notification message, a target terminal from terminals served by the second base station, the second base station verifies legality of the target terminal to obtain a verification result, and reduces interference with the target resource block according to at least one of the verification result or a terminal type to which the target terminal belongs, where the second base station is a base station adjacent to the first base station, and the target terminal is a terminal that is using the target resource block.

Figure 20:
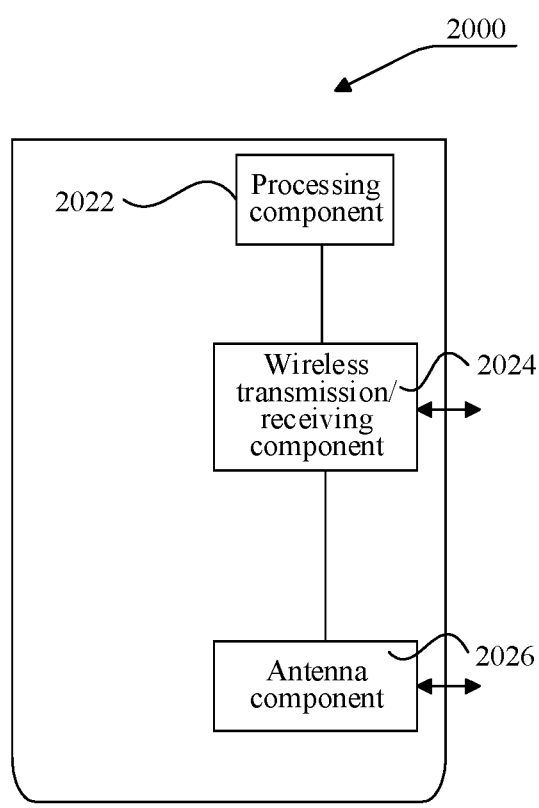
FIG. 20 is a schematic structural diagram of a device for controlling interference according to an exemplary embodiment of the present disclosure.

As illustrated in FIG. 20, FIG. 20 is a schematic structural diagram of a device 2000 for controlling interference according to an exemplary embodiment. The device 2000 may be provided as a base station. Referring to FIG. 20, the device 2000 includes a processing component 2022, a wireless transmission/receiving component 2024, an antenna component 2026 and a wireless interface-specific signal processing part. The processing component 2022 may further include one or more processors.

One processor in the processing component 2022 may be configured to:

determine, in response to determining presence of interference from an unmanned aerial vehicle or a terminal similar to an unmanned aerial vehicle, a target resource block from all resource blocks for data transmission, which is interfered with by the unmanned aerial vehicle or the terminal similar to an unmanned aerial vehicle;

generate a target notification message, where the target notification message carries resource block information of the target resource block and an interference indication identifier, and the interference indication identifier is used to indicate that the current interference comes from the unmanned aerial vehicle or the terminal similar to an unmanned aerial vehicle; and send the target notification message to a second base station, so that after determining, based on the target notification message, a target terminal from terminals served by the second base station, the second base station verifies legality of the target terminal to obtain a verification result, and reduces interference with the target resource block according to at least one of the verification result or a terminal type to which the target terminal belongs, where the second base station is a base station adjacent to the first base station, and the target terminal is a terminal using the target resource block currently.

Correspondingly, the present disclosure also provides a device for controlling interference. The device is applied to a second base station and includes:

a processor; and a memory configured to store instructions executable for the processor, where the processor is configured to:

receive a target notification message sent by a first base station, where the first base station is a base station adjacent to the second base station and interfered with by an unmanned aerial vehicle or a terminal similar to an unmanned aerial vehicle, the target notification message carries resource block information of the target resource block of the first base station that is interfered with by the unmanned aerial vehicle or the terminal similar to the unmanned aerial vehicle and an interference indication identifier, and the interference indication identifier is used to indicate that the current interference comes from the unmanned aerial vehicle or the terminal similar to an unmanned aerial vehicle;

determine, based on the target notification message, a target terminal from terminals served by the second base station, the target terminal being a terminal using the target resource block currently;

verify legality of the target terminal to obtain a verification result; and reduce interference with the target resource block according to at least one of the verification result or a terminal type to which the target terminal belongs.

Figure 21:
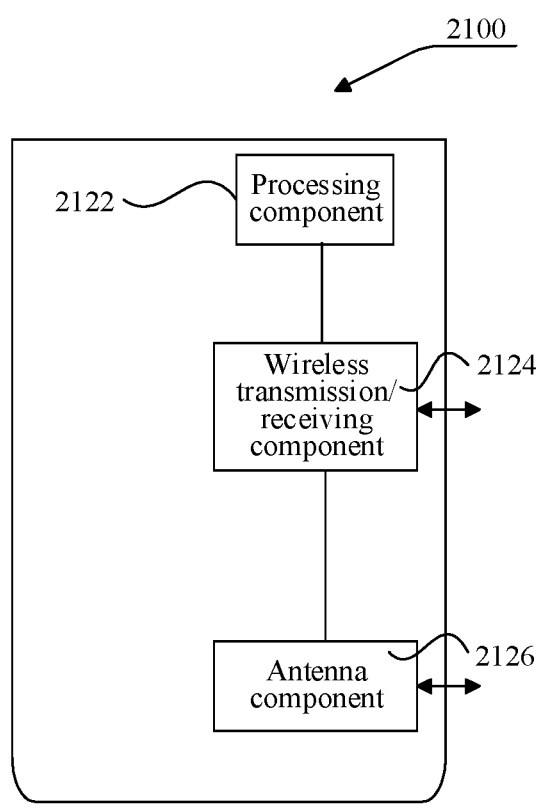
FIG. 21 is a schematic structural diagram of another device for controlling interference according to an exemplary embodiment of the present disclosure.

As illustrated in FIG. 21, FIG. 21 is a schematic structural diagram of an device 2100 for controlling interference according to an exemplary embodiment. The device 2100 may be provided as a base station. Referring to FIG. 21, the device 2100 includes a processing component 2122, a wireless transmission/receiving component 2124, an antenna component 2126 and a wireless interface-specific signal processing part. The processing component 2122 may further include one or more processors.

One processor in the processing component 2122 may be configured to:

receive a target notification message sent by a first base station, where the first base station is a base station adjacent to the second base station and interfered with by an unmanned aerial vehicle or a terminal similar to an unmanned aerial vehicle, the target notification message carries resource block information of a target resource block of the first base station that is interfered with by the unmanned aerial vehicle or the terminal similar to the unmanned aerial vehicle and an interference indication identifier, and the interference indication identifier is used to indicate that the current interference comes from the unmanned aerial vehicle or the terminal similar to an unmanned aerial vehicle;

determine, based on the target notification message, a target terminal from terminals served by the second base station, the target terminal being a terminal using the target resource block currently;

verify legality of the target terminal to obtain a verification result; and reduce interference with the target resource block according to at least one of the verification result or a terminal type to which the target terminal belongs.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for controlling interference, implemented by a first base station, the method comprising:
   in response to determining presence of interference from an unmanned aerial vehicle, determining a target resource block, from all resource blocks for data transmission, which is interfered with by the unmanned aerial vehicle;
   generating a target notification message, wherein the target notification message carries resource block information of the target resource block and an interference indication identifier, and the interference indication identifier is used to indicate that the interference comes from the unmanned aerial vehicle; and
   sending the target notification message to a second base station, so that the second base station determines, based on the target notification message, a target terminal from terminals served by the second base station, verifies legality of the target terminal to obtain a verification result, and reduces interference with the target resource block according to at least one of the verification result or a terminal type to which the target terminal belongs, wherein the second base station is a base station adjacent to the first base station, and the target terminal is a terminal that is using the target resource block.

2. The method of claim 1, wherein the determining the presence of interference from the unmanned aerial vehicle comprises:
   detecting an angle of arrival corresponding to a presently received interference signal, wherein the angle of arrival is an angle between the interference signal and a horizontal plane; and
   when an angle value of the angle of arrival exceeds a preset value, determining the presence of interference from the unmanned aerial vehicle or.

3. The method of claim 1, wherein the determining the target resource block, from all resource blocks for data transmission, which is interfered with by the unmanned aerial vehicle comprises:
   detecting signal to noise ratios corresponding to all resource blocks for data transmission, and
   selecting, according to a descending order of the signal to noise ratios, at least one resource block as the target resource block that is interfered with by the unmanned aerial vehicle.

4. The method of claim 1, wherein the sending the target notification message to the second base station comprises:
   sending the target notification message to the second base station; or
   sending the target notification message to a core network, so that the core network forwards the target notification message to the second base station.

5. The method of claim 1, wherein the reducing interference with the target resource block according to at least one of the verification result or the terminal type to which the target terminal belongs comprises:
   when the verification result is legal and the terminal type belongs to an unmanned aerial vehicle type, judging whether a priority of a service presently carried by the target terminal exceeds a preset priority;
   when the priority of the service presently carried by the target terminal exceeds the preset priority, allocating other resource blocks to a terminal that is using the target resource block and does not belong to an unmanned aerial vehicle type; and
   when the priority of the service presently carried by the target terminal does not exceed the preset priority, reducing power on the target resource block, or allocating other resource blocks to the target terminal.

6. A device implementing the method for controlling interference according to claim 1, located in a first base station, the device comprising:
   a transceiver; and
   a processor;
   wherein the processor is arranged to perform, through the transceiver, operations of the method.

7. The device of claim 6, wherein the processor is further arranged to:
   detect an angle of arrival corresponding to a presently received interference signal, wherein the angle of arrival is an angle between the interference signal and a horizontal plane; and
   determine, when an angle value of the angle of arrival exceeds a preset value, the presence of interference from the unmanned aerial vehicle.

8. A method for controlling interference, implemented by a second base station, the method comprising:
   receiving a target notification message from a first base station, wherein the first base station is a base station adjacent to the second base station and interfered with by an unmanned aerial vehicle, the target notification message carries resource block information of a target resource block of the first base station that is interfered with by the unmanned aerial vehicle and an interference indication identifier, and the interference indication identifier is used to indicate that interference comes from the unmanned aerial vehicle;
   determining, based on the target notification message, a target terminal from terminals served by the second base station, wherein the target terminal is a terminal that is using the target resource block;
   verifying legality of the target terminal to obtain a verification result; and
   reducing interference with the target resource block according to at least one of the verification result or a terminal type to which the target terminal belongs.

9. The method of claim 8, wherein the receiving the target notification message from the first base station comprises:
   receiving the target notification message from the first base station; or
   receiving the target notification message forwarded by a core network, wherein the target notification message is sent to the core network by the first base station.

10. The method of claim 8, wherein the verifying the legality of the target terminal to obtain the verification result comprises:
    sending a target terminal identifier of the target terminal to a verifier, so that the verifier searches for the target terminal identifier in a pre-stored legal identification information list, and when the legal identification information list comprises the target terminal identifier, the verification result is determined to be legal, and otherwise the verification result is determined to be illegal, wherein the legal identification information list comprises identification information corresponding to all registered terminals; and
    receiving the verification result returned by the verifier, wherein the verifier is the core network or a verification server.

11. The method of claim 8, wherein the terminal type to which the target terminal belongs is determined in the following manners:
    sending a target terminal identifier of the target terminal to the core network, so that the core network determines a terminal type corresponding to the target terminal identifier according to a pre-stored correspondence between a terminal identifier and a terminal type; and
    receiving the terminal type returned by the core network.

12. The method of claim 8, wherein the reducing the interference with the target resource block according to at least one of the verification result or the terminal type to which the target terminal belongs comprises:
    when the verification result is illegal, releasing an established connection with the target terminal.

13. The method of claim 8, wherein the reducing interference with the target resource block according to at least one of the verification result or the terminal type to which the target terminal belongs comprises:
    when the verification result is legal and the terminal type does not belong to an unmanned aerial vehicle type, reducing power on the target resource block;
    or, when the verification result is legal and the terminal type does not belong to an unmanned aerial vehicle type, allocating other resource blocks to the target terminal.

14. A device for controlling interference, located in a second base station, the device comprising a processor and a transceiver, wherein the transceiver is arranged to receive a target notification message from a first base station, wherein the first base station is a base station adjacent to the second base station and interfered with by an unmanned aerial vehicle, the target notification message carries resource block information of a target resource block of the first base station that is interfered with by the unmanned aerial vehicle and an interference indication identifier, and the interference indication identifier is used to indicate that interference comes from the unmanned aerial vehicle;

the processor is arranged to: determine, based on the target notification message, a target terminal from terminals served by the second base station, wherein the target terminal is a terminal that is using the target resource block;

verify legality of the target terminal to obtain a verification result; and reduce interference with the target resource block according to at least one of the verification result or a terminal type to which the target terminal belongs.

15. The device of claim 14, wherein the transceiver is further arranged to:

receive the target notification message from the first base station; or receive the target notification message forwarded by a core network, wherein the target notification message is sent to the core network by the first base station.

16. The device of claim 14, wherein the processor is further arranged to:

send, through the transceiver, a target terminal identifier of the target terminal to a verifier, so that the verifier searches for the target terminal identifier in a pre-stored legal identification information list, and when the legal identification information list comprises the target terminal identifier, the verification result is determined to be legal, and otherwise the verification result is determined to be illegal, wherein the legal identification information list comprises identification information corresponding to all registered terminals; and receive, through the transceiver, the verification result returned by the verifier, wherein the verifier is the core network or a verification server.

17. The device of claim 14, wherein the processor is further arranged to:

send, through the transceiver, a target terminal identifier of the target terminal to the core network, so that the core network determines a terminal type corresponding to the target terminal identifier according to a pre-stored correspondence between a terminal identifier and a terminal type; and receive, through the transceiver, the terminal type returned by the core network.

18. The device of claim 14, wherein the processor is further arranged to:

release, when the verification result is illegal, an established connection with the target terminal.

19. The device of claim 14, wherein the processor is further arranged to:

reduce, when the verification result is legal and the terminal type does not belong to an unmanned aerial vehicle type, power on the target resource block; or allocate, when the verification result is legal and the terminal type does not belong to an unmanned aerial vehicle type, other resource blocks to the target terminal.

20. The device of claim 14, wherein the processor is further arranged to:

judge, when the verification result is legal and the terminal type belongs to an unmanned aerial vehicle type, whether a priority of a service presently carried by the target terminal exceeds a preset priority;

allocate, when the priority of the service presently carried by the target terminal exceeds the preset priority, other resource blocks to a terminal that is using the target resource block and does not belong to the unmanned aerial vehicle type; and reduce, when the priority of the service presently carried by the target terminal does not exceed the preset priority, power on the target resource block, or allocate other resource blocks to the target terminal.

* * * * *